(12) United States Patent
Yu et al.

(10) Patent No.: US 7,784,283 B2
(45) Date of Patent: Aug. 31, 2010

(54) SOUND-ABSORBING EXHAUST NOZZLE CENTER PLUG

(75) Inventors: Jia Yu, San Diego, CA (US); Eugene W. Chien, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1038 days.

(21) Appl. No.: 11/417,274

(22) Filed: May 3, 2006

(65) Prior Publication Data

US 2007/0256889 A1 Nov. 8, 2007

(51) Int. Cl.
*F02K 1/00* (2006.01)
(52) U.S. Cl. .................. 60/770; 239/265.11; 181/213; 181/284
(58) Field of Classification Search .................. 60/262, 60/263, 770; 239/265.11; 415/115; 181/284, 181/292, 293
See application file for complete search history.

(56) References Cited

U.S. PATENT DOCUMENTS

| | | | | | |
|---|---|---|---|---|---|
| 2,988,302 | A | * | 6/1961 | Smith | 244/15 |
| 3,215,172 | A | * | 11/1965 | Ardoin | 181/220 |
| 3,791,483 | A | * | 2/1974 | Vasiljevic | 181/252 |
| 3,948,346 | A | | 4/1976 | Schindler | |
| 4,064,961 | A | | 12/1977 | Tseo | |
| 4,100,993 | A | | 7/1978 | Feder | |
| 4,137,992 | A | * | 2/1979 | Herman | 181/213 |
| 4,150,732 | A | * | 4/1979 | Hoch et al. | 181/213 |
| 4,226,297 | A | | 10/1980 | Cicon | |
| 4,231,447 | A | | 11/1980 | Chapman | |
| 4,240,519 | A | | 12/1980 | Wynosky | |
| 4,244,441 | A | * | 1/1981 | Tolman | 181/213 |
| 4,433,751 | A | * | 2/1984 | Bonneau | 181/213 |
| 4,743,740 | A | | 5/1988 | Adee | |
| 4,837,618 | A | | 6/1989 | Hatori et al. | |
| 4,942,078 | A | | 7/1990 | Newman et al. | |
| 4,972,197 | A | | 11/1990 | McCauley et al. | |
| 5,162,620 | A | * | 11/1992 | Ross et al. | 181/220 |
| 5,344,696 | A | | 9/1994 | Hastings et al. | |
| 5,361,183 | A | | 11/1994 | Wiese | |
| 5,365,025 | A | * | 11/1994 | Kraai et al. | 181/249 |
| 5,824,996 | A | | 10/1998 | Kockman et al. | |
| 5,925,275 | A | | 7/1999 | Lawson et al. | |

(Continued)

OTHER PUBLICATIONS

R.E. Evans, D.E. Hall and B.A. Luxon, Nickel Coated Graphite Fiber Conductive Composites, SAMPE Quarterly, vol. 17, No. 4, Jul. 1986.

*Primary Examiner*—Michael Cuff
*Assistant Examiner*—Phutthiwat Wongwian
(74) *Attorney, Agent, or Firm*—Womble Carlyle Sandridge & Rice, PLLC (57) ABSTRACT

A sound-absorbing exhaust nozzle center plug for an aircraft gas turbine engine can include an outer skin and at least one forward cavity within the outer skin. At least one aft cavity can be located within the outer skin and substantially aft of the forward cavity. A perforated wall including a plurality of first openings can be disposed between the forward and aft cavities. The outer skin can include a second plurality of openings providing an acoustic pathway through the outer skin and into the forward cavity. The forward and aft cavities can be configured to absorb and dissipate relatively low-frequency sound energy emitted from an aircraft gas turbine engine's combustor.

25 Claims, 8 Drawing Sheets

U.S. PATENT DOCUMENTS

| | | |
|---|---|---|
| 5,934,617 A | 8/1999 | Rutherford |
| 5,942,140 A | 8/1999 | Miller et al. |
| 5,947,418 A | 9/1999 | Bessiere et al. |
| 5,971,323 A | 10/1999 | Rauch et al. |
| 6,031,214 A | 2/2000 | Bost et al. |
| 6,137,083 A | 10/2000 | Bost et al. |
| 6,145,787 A | 11/2000 | Rolls |
| 6,194,685 B1 | 2/2001 | Rutherford |
| 6,330,986 B1 | 12/2001 | Rutherford et al. |
| 6,338,455 B1 | 1/2002 | Rauch et al. |
| 6,403,935 B2 | 6/2002 | Kockman et al. |
| 6,483,087 B2 | 11/2002 | Gardner et al. |
| 6,521,873 B1 | 2/2003 | Cheng et al. |
| 6,845,607 B2 * | 1/2005 | Lair .............................. 60/263 |
| 6,870,139 B2 | 3/2005 | Petrenko |
| 6,935,834 B2 * | 8/2005 | Lata Perez .................. 415/115 |
| 7,034,257 B2 | 4/2006 | Petrenko |
| 2002/0096506 A1 | 7/2002 | Moreland et al. |
| 2003/0222077 A1 | 12/2003 | Suda et al. |
| 2003/0234248 A1 | 12/2003 | Kano et al. |
| 2004/0065659 A1 | 4/2004 | Tse |
| 2004/0069772 A1 | 4/2004 | Kondo et al. |
| 2004/0074899 A1 | 4/2004 | Mariner et al. |
| 2005/0006529 A1 | 1/2005 | Moe et al. |
| 2005/0189345 A1 | 9/2005 | Brunner et al. |
| 2006/0032983 A1 | 2/2006 | Brand et al. |

* cited by examiner

SOUND-ABSORBING EXHAUST NOZZLE CENTER PLUG

FIELD

The invention generally relates to aircraft engines, and more particularly relates to an exhaust nozzle center plug having at least one resonator cavity for absorbing and/or dissipating core engine noise at frequencies of about 800 Hz or less.

BACKGROUND

An airplane's airframe and engines produce varying amounts of audible noise during takeoff and landing. For example, an aircraft's engines typically operate at or near maximum thrust as the aircraft departs from an airport, and lower thrust as the aircraft approaches an airport. Some aircraft engine noise can be partially suppressed at the engine nacelle inlet and the exhaust nozzle by noise absorbing liners. These liners can absorb acoustic energy by canceling acoustic reflected waves and/or converting acoustic energy into heat, and typically consist of a porous skin supported by an open-cell matrix. The open-cell matrix provides separation between the porous skin and a non-perforated backskin. Some have postulated that the porous skin, open cells, and non-perforated backskin of such liners combine to form a plurality of Helmholtz resonators that resonate in response to certain sound frequencies or certain bands of frequencies, and cancel sound waves reflected between the porous face skin and non-perforated backskin and/or subsequently convert sound energy to heat (via elastic or mechanical hysteresis caused by the resonant response of air within the resonator cavities and of the liner components), and thereby effectively absorb or dissipate at least a portion of generated engine noise.

Figure 1:
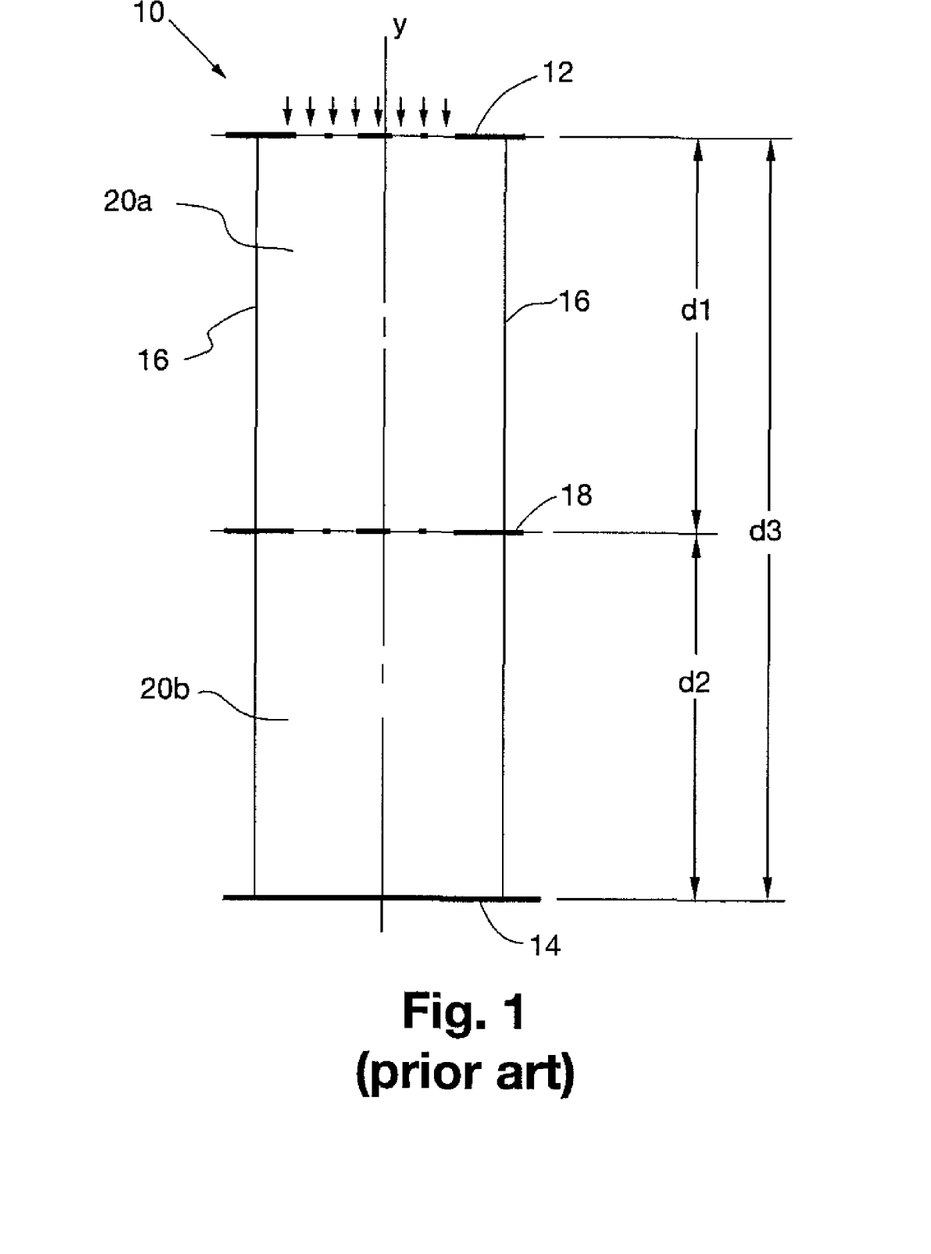
FIG. 1 is a cross sectional view of a typical double-degree-of-freedom, non-folding resonator cell of a prior art acoustic liner.

FIG. 1 shows a cross-section of a typical double-degree-of-freedom resonator cavity 10 of a prior art acoustic liner for modern aircraft gas turbine engines. A typical acoustic liner may include a plurality of such cavities 10 arranged in a compact side-by-side array. A perforated face skin 12, an imperforate back skin 14, and cell walls 16 bound the cavity 10. A honeycomb matrix, or another similar open-cell matrix, of a type well known in the art, may define the cell walls 16. In this double-degree-of-freedom arrangement, a perforated septum 18 divides the cell into a first chamber 20a proximate to the perforated face skin 12, and a second chamber 20b proximate to the imperforate back skin. A single-degree-of-freedom resonator cavity can be constructed substantially the same as shown in FIG. 1, but without the septum 18. The percentage open area ("POA") of the face skin 12 and the POA of the septum 18 are selected to reduce the acoustic impedances of the face skin 12 and septum 18 in order to permit a desired degree of propagation of sound waves through the membranes 12, 18 at targeted frequencies. Sound waves enter the cell 10 by propagating through the perforated face skin 12 in a direction that is substantially perpendicular to the face skin 12 (see arrows in FIG. 1). The entering sound waves travel through the column of air contained within the cavity 10 in a direction that is substantially parallel to a principal longitudinal axis "y" of the cavity 10. Because sound waves enter the cavity 10 and propagate through air within cavity 10 along a substantially straight and unaltered path, such resonator cavities can be referred to as "non-folding" cavities.

Referring again to FIG. 1, entering sound waves propagate through air contained within the first chamber 20a, through the perforated septum 18, through air contained within the second chamber 20b, and are reflected by the imperforate back skin 14 (which has a relatively high acoustic impedance). The overall depths "$d_1$," "$d_2$" of the two chambers 20a, 20b (as well as the thickness and POA of the face skin 12, the thickness and POA of the septum 18, the diameter/width of the cell 10, etc.) are selected such that the chambers 20a, 20b harmonically resonate in response to sound waves having one or more target frequencies and wavelengths. Configuring a resonator cavity to resonantly respond to a particular sound frequency sometimes is referred to as "tuning" the cavity. As shown in FIG. 1, the total depth "$d_3$" of the cell is the sum of the depths "$d_1$," "$d_2$" of the two chambers 20a, 20b and the thickness of the perforated septum 18. Depending on the available space (and possibly other engine design constraints), the total depth "$d_3$" of the non-folding resonator cavities 10 of an acoustic liner often cannot exceed a maximum permissible depth "$d_{max}$" (i.e. $d_3 \leq d_{max}$), as discussed below.

In practice, the limited maximum depth "$d_{max}$" of a conventional acoustic liner with non-folding resonator cavities can restrict the use of such liners to the absorption of relatively high-frequency, short-wavelength noise, such as noise generated by the rapid rotation of an engine's fan and compressor and turbine blades (i.e., frequencies from about 800 Hz to about 6000 Hz). In other words, for low frequency sound waves less than about 800 Hz, the total depth "$d_3$" necessary to form a deep, large-volume, non-folding cavity 10 that can be tuned to harmonically resonate at such low frequencies may exceed the available depth "$d_{max}$". Thus, though traditional non-folding acoustic liners may not be adaptable to absorb and dissipate relatively low frequency sound energy (i.e., less than about 800 Hz) like that commonly produced by an aircraft gas turbine engine's combustor (sometimes referred to as "core noise").

Government regulators increasingly mandate aircraft engines with reduced noise signatures, and as a result, aircraft manufacturers, airline companies, and airport communities frequently demand such engines on aircraft. In order to achieve further reductions in modern aircraft gas turbine engine noise levels, especially during aircraft takeoffs and approaches, it is desirable to dissipate some of the low-frequency noise generated by an engine's combustor. Accordingly, there is a need for an aircraft gas turbine engine with acoustic treatment at or near the engine's combustor exhaust. More particularly, there is a need for an aircraft gas turbine engine with acoustic treatment at or near the engine's exhaust nozzle that is effective at dissipating some sound energy at frequencies less than about 800 Hz. In particular, there is a need for an acoustically treated hot nozzle center plug for a aircraft gas turbine engine that is capable of dissipating some combustor exhaust noise having one or more frequencies less than about 800 Hz.

SUMMARY

The invention includes a sound-absorbing exhaust center plug for an aircraft gas turbine engine that can include an outer skin, at least one forward cavity within the center plug, and at least one aft cavity within the center plug that is substantially aft of the forward cavity. A wall can be disposed between the forward and aft cavities, and can include a plurality of first openings therethrough. The outer skin can include a second plurality of openings providing an acoustic pathway through the outer skin and into the forward cavity.

The invention also includes a noise-absorbing center plug for a jet engine exhaust nozzle. The center plug can include a plurality of walls defining a plurality of circumferentially spaced resonator cavities. At least one wall can separate at least one of the resonator cavities into a forward sub-cavity and an aft sub-cavity, and can include a plurality of openings extending therethrough.

The invention further includes a noise-absorbing exhaust nozzle center plug for an aircraft gas turbine engine that can include an outer skin having a first longitudinal axis, and an inner skin. The outer skin and inner skin can form a substantially annular space therebetween. A plurality of walls can separate the annular space into a plurality of substantially longitudinally-extending cavities. At least one wall can divide the longitudinally extending cavities into forward and aft sub-cavities, and can include a plurality of openings extending therethrough.

In addition, the invention includes a center plug for an aircraft gas turbine engine exhaust nozzle that includes a plurality of walls dividing an interior portion of the center plug into a plurality of forward cavities and a plurality of aft cavities. The center plug can include means for permitting passage of sound energy between the forward and aft cavities, and means for restricting the sound energy passing between the forward and aft cavities to a substantially plane mode of oscillation.

The invention further includes an acoustically treated center plug for an aircraft gas turbine engine exhaust nozzle that can include an outer skin having a first perforated portion with a first plurality of openings extending therethrough. The outer skin also can have a second perforated portion with a second plurality of openings extending therethrough. The center plug can also include at least one folding resonator cavity within the center plug that is configured to receive sound waves that propagate through the first perforated portion. A plurality of non-folding resonator cavities may be provided proximate to the outer skin, and may be configured to receive sound waves that propagate through the second perforated portion. An inner skin may form a substantially hollow conduit through the center plug. The folding resonator cavity can be configured to resonate in response to sound waves in a first range of frequencies, and the non-folding resonator cavities can be configured to resonate in response to sound waves in a second range of frequencies different from the first range of frequencies.

The invention also includes an aircraft gas turbine engine that includes an exhaust nozzle and a center plug at least partially disposed in the exhaust nozzle. The center plug can include a plurality of walls that define a plurality of circumferentially spaced resonator cavities. At least one wall can separate at least one of the resonator cavities into a forward sub-cavity and an aft sub-cavity, and can include a plurality of openings extending therethrough.

These and other aspects of the invention can be understood from a reading of the following detailed description together with the drawings.

DETAILED DESCRIPTION

Figure 2:
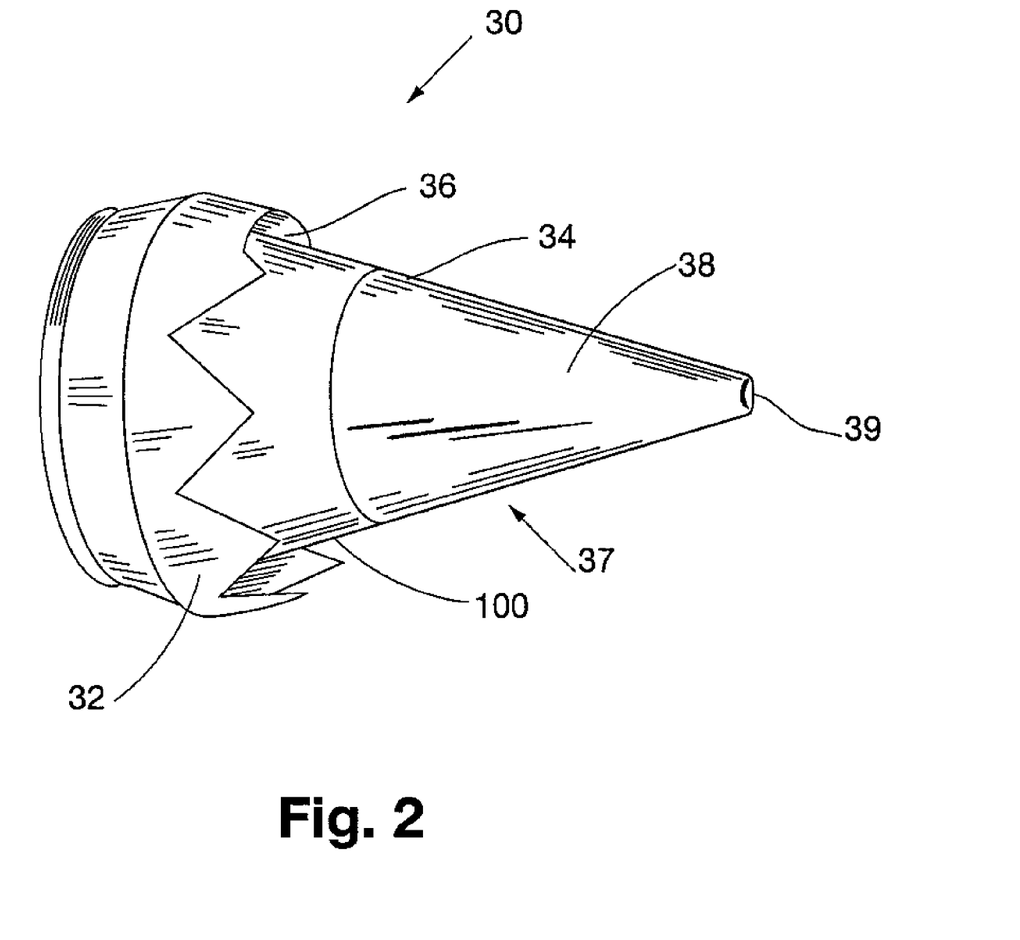
FIG. 2 is a perspective view of the combustor exhaust portion of an aircraft gas turbine engine including an acoustically treated center plug according to the invention.

FIG. 2 shows one embodiment of a combustor exhaust portion 30 of a modern aircraft gas turbine engine. The combustor exhaust portion 30 includes an exhaust nozzle 32 and an exhaust centerbody 37. The centerbody 37 can be formed in two sections including an acoustically treated forward portion (referred to herein as a "center plug") 100 according to the invention, and an aft cone portion 38. The exhaust nozzle 32 and center plug 100 cooperate to form an annulus 36 through which exhaust gases from the engine's combustor exit the exhaust portion 30 to generate forward thrust. In this embodiment, the center plug 100 and cone portion 38 of the centerbody 37 are connected along a circumferential seam 34 at the aft end of the center plug 100. In the embodiment shown in FIG. 2, the aft portion of the center plug 100 and the attached cone portion 38 extend outwardly from the aft end of the nozzle 32. The outer surfaces of the center plug 100 and the cone 38 combine to form a flow control surface that substantially prevents recirculation of the exiting exhaust gasses, and facilitates convergence of the exhaust gasses as they exit the annulus 36. The center plug 100 of the centerbody 37 forms a transition between the aft end of a turbine rotor (not shown) located just inside the combustor exhaust portion 30, and the cone 38. The center plug 100 and cone 38 may have hollow center portions (not shown in FIG. 2) that permit cooling air to pass from an intake 39 at the aft tip of the cone to internal portions of the engine, and/or house instrumentation, wiring, or the like, etc.

Figure 3:
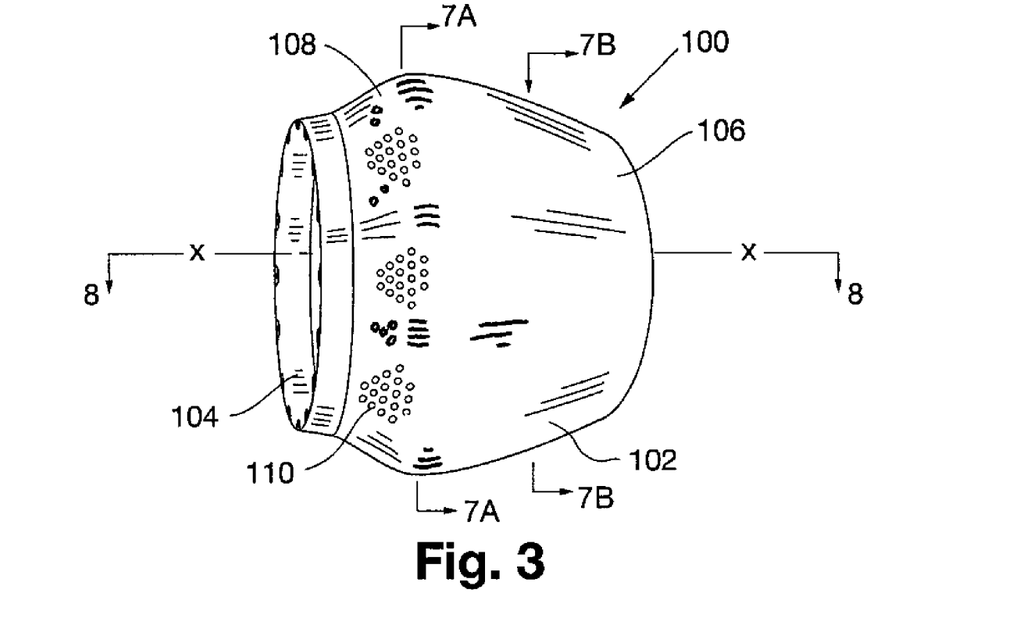
FIG. 3 is a perspective view of one embodiment of an acoustically treated hot nozzle center plug according to the invention.
Figure 8:
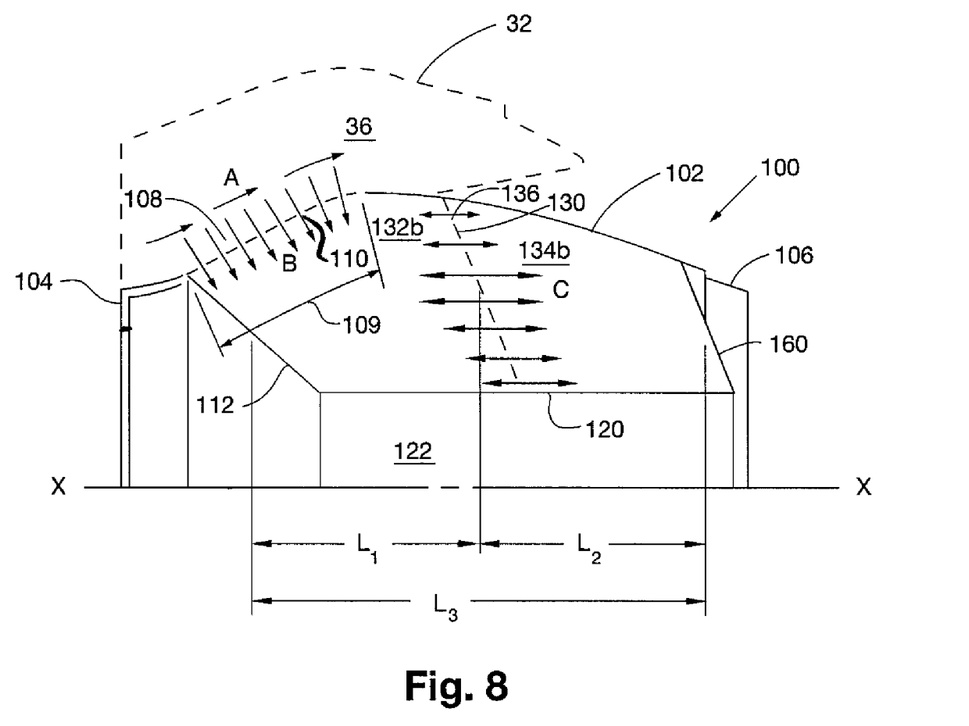
FIG. 8 is a partial cross-sectional view of the center plug shown in FIGS. 2-7B taken along line 8-8 in FIG. 3.

FIG. 3 shows one embodiment of an acoustically treated center plug 100 according to the invention. In this embodiment, the center plug 100 includes an outer skin 102 having an aerodynamic outer contour. In a preferred embodiment, the outer skin 102 is seamlessly constructed such that the center plug 100 has a substantially smooth outer surface. The center plug 100 can have a forward flanged end 104 configured for attachment to a fairing proximate to the aft end of a turbine rotor (not shown), and an aft flanged end 106 configured for attachment to a cone 38 like that shown in FIG. 2. As shown in FIG. 3, the outer skin 102 can include at least one acoustically permeable portion 108. The acoustically permeable portion 108 can be formed by a plurality of spaced openings 110 that extend through the outer skin 102. In the embodiment shown in FIG. 3, the acoustically permeable portion 108 is located on a forward portion of the outer skin 102, and extends around substantially the entire circumference of the forward portion of the outer skin. As shown in FIG. 8, the perforated portion 108 may coincide with a forward portion of one or more forward resonator cavities 132b. Alternatively, the perforated portion 108 may coincide with an aft portion of one or more forward resonator cavities 132b. Further details of the acoustically permeable portion 108 are described below.

Figure 4:
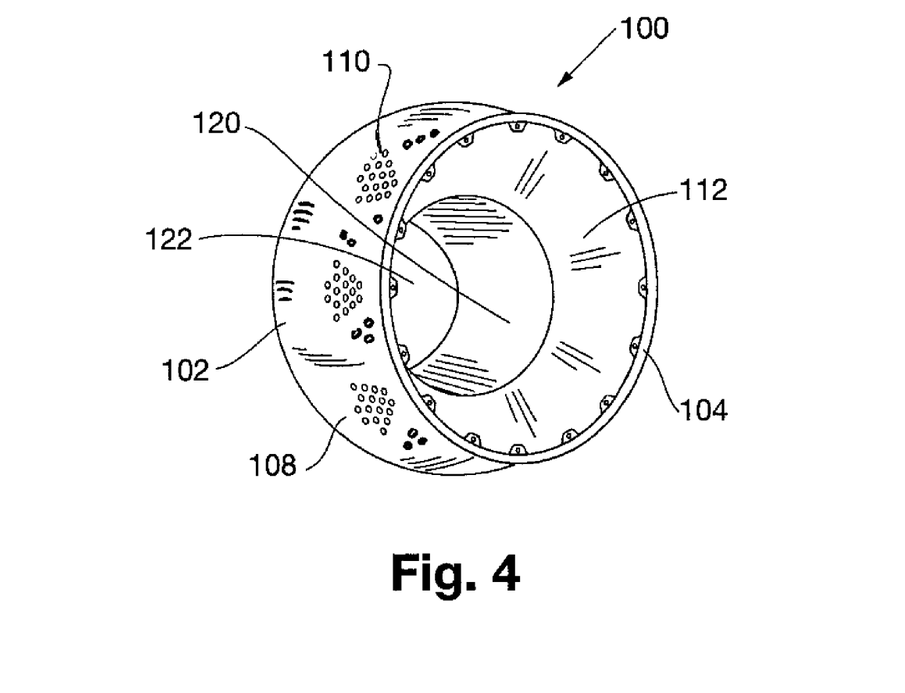
FIG. 4 is a perspective view of the hot nozzle center plug of FIG. 3 showing the forward end of the plug.

As shown in FIG. 4, the center plug 100 includes a substantially open center 122 bounded by an inner skin 120. The inner skin 120 may be constructed in segments, or in a single piece. In the embodiment shown, the inner skin 120 has a substantially cylindrical shape, and is centered along a central longitudinal axis "x-x" (shown in FIG. 3) of the center plug 100. An imperforate forward bulkhead 112 extends between the inner skin 120 and the outer skin 102 proximate to the forward flange 104.

Figure 5:
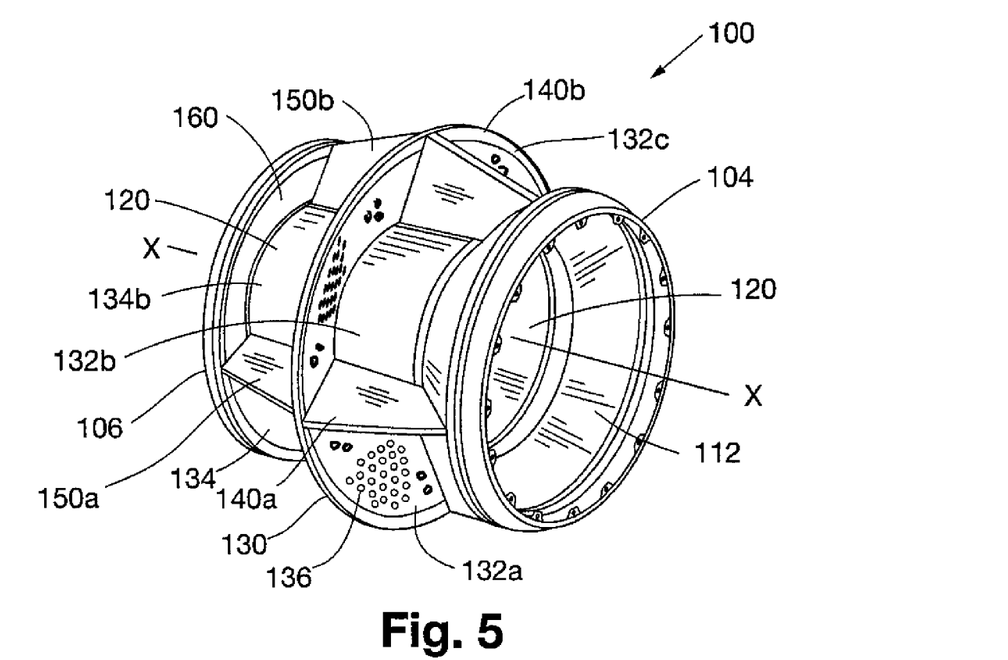
FIG. 5 is a perspective view of the hot nozzle center plug of FIGS. 3 and 4 with the outer skin removed.
Figure 6:
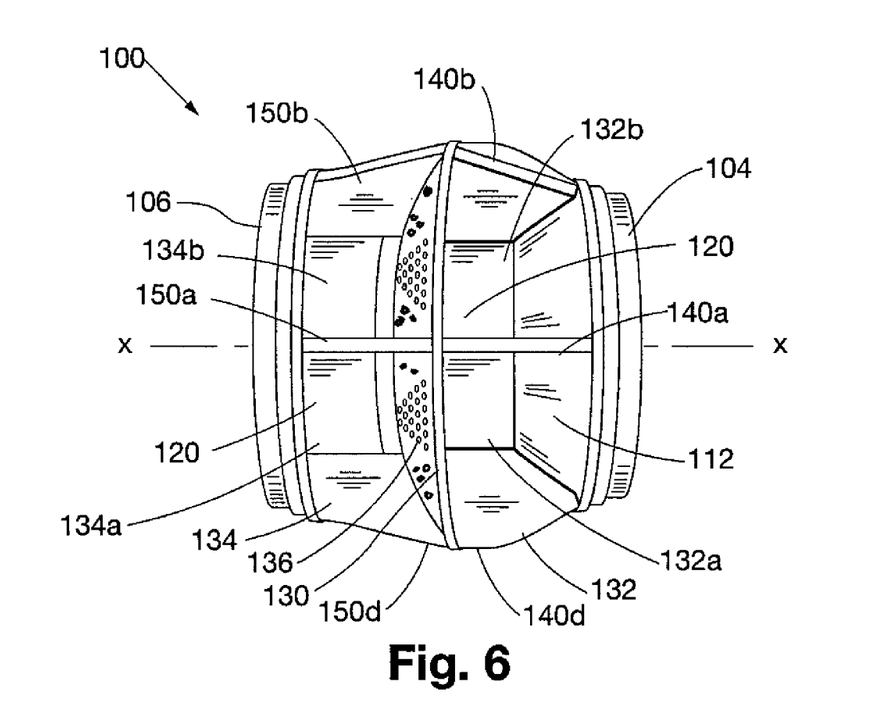
FIG. 6 is a side view of the interior portions of the center plug shown in FIG. 5.

FIGS. 5 and 6 show the center plug 100 with the outer skin 102 removed. As shown in FIG. 5, an imperforate aft bulkhead 160 is located proximate to the aft flange 106. The aft bulkhead 160 extends between the inner skin 120 and the outer skin (not shown in FIG. 5). A perforated intermediate wall or bulkhead 130 is located intermediate the forward bulkhead 112 and the aft bulkhead 160. The intermediate bulkhead 130 divides the region bounded by the inner skin 120, the forward bulkhead 112, the aft bulkhead 160, and the outer skin 102 (not shown in FIGS. 5 and 6) into a forward annular chamber 132 and an aft annular chamber 134. The perforated intermediate bulkhead 130 provides structural support to the outer skin 102, and can prevent or at least minimize non-planar sound wave modes from propagating between the forward and aft chambers 132, 134.

Figure 7A:
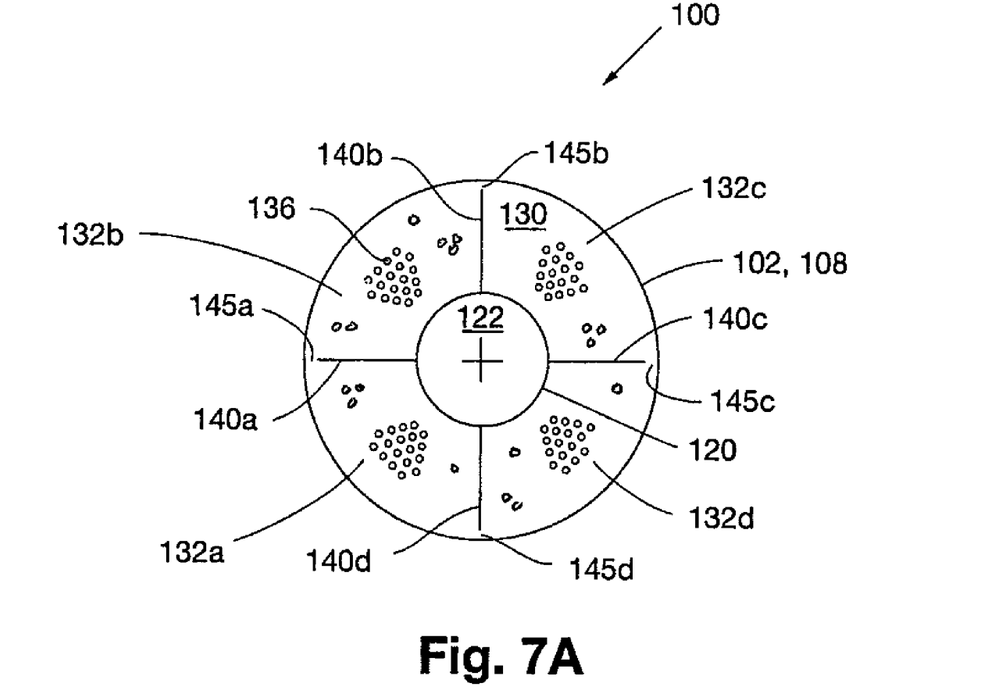
FIG. 7A is a cross-sectional view of a forward portion of the hot nozzle center plug of FIGS. 2-6 taken along line 7A-7A in FIG. 3.

A plurality of imperforate forward baffles 140a-140d (forward baffle 140c is hidden from view) can divide the forward annular chamber 132 into a plurality of forward resonator cavities 132a-132d. A plurality of imperforate aft baffles 150a-150d (aft baffle 150c is hidden from view) similarly can divide the aft annular chamber 134 into a plurality of aft resonator cavities 134a-134d. In the embodiment shown in FIGS. 5 and 6, four forward baffles 140a-140d divide the forward chamber 132 into four forward resonator cavities 132a-132d having substantially equal volumes and dimensions. Similarly, four aft baffles 150a-150d divide the aft chamber 134 into four forward resonator cavities 134a-134d having substantially equal volumes and dimensions. In this embodiment, each of the forward baffles 140a-140d is axially aligned with one of the aft baffles 150a-150d. As shown in FIG. 7, each of the baffles 140a-140d (and each of the axially aligned aft baffles 150a-150d) extends substantially radially outward from the central longitudinal axis "x-x" of the center plug 100. The forward and aft baffles 140a-140d and 150a-150d act to at least partially prevent sound waves that enter the resonator cavities 132a-132d and 134a-134d from propagating in a circumferential direction between adjacent cavities, and helps to restrict the sound waves to lower order modes of oscillation and propagation, such as plane wave modes.

Figure 7B:
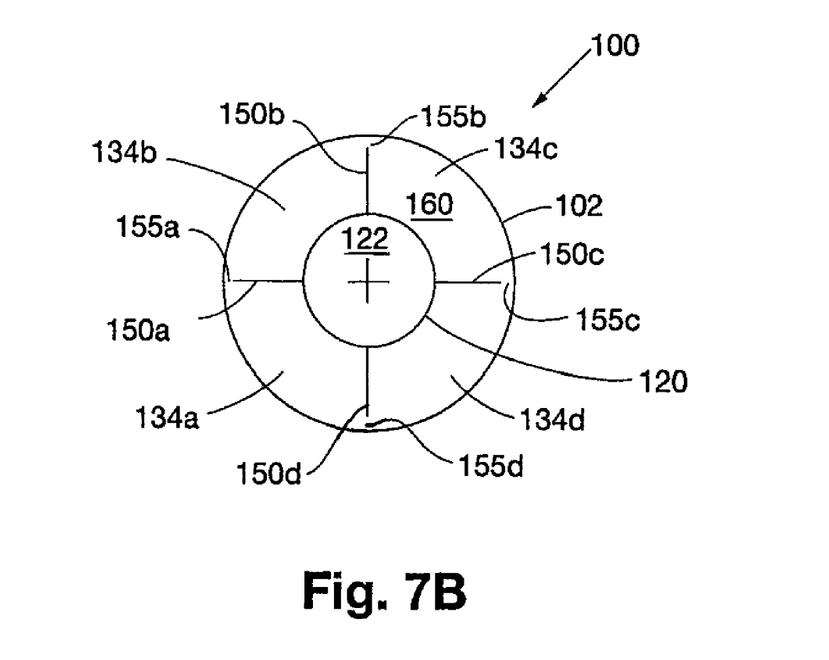
FIG. 7B is a cross-sectional view of an aft portion of the hot nozzle center plug of FIGS. 2-6 taken along line 7B-7B in FIG. 3.

As shown in FIG. 7A, small radial gaps 145a-145d may exist between the outermost edges of the forward baffles 140a-140d and the outer skin 102 in order to accommodate differential thermal expansion between the baffles 140a-140d and the outer skin 102 during thermal transient conditions. Similarly, as shown in FIG. 7B, gaps 155a-155d may exist between the outermost edges of the aft baffles 150a-150d and the outer skin 102 in order to accommodate differential thermal expansion between the baffles 150a-150d and the outer skin 102 during thermal transients. Such gaps 145a-145d, 155a-155b do not substantially adversely affect the ability of the resonator cavities 132a-132d and 134a-134d to dissipate targeted low-frequency sound energy.

FIG. 8 shows a partial longitudinal cross section of the center plug 100 described above. Also shown in phantom lines in FIG. 8 is an exhaust nozzle 32 that cooperates with the outer skin 102 of the center plug 100 to define an annular exhaust duct 36. As indicated by arrows "A" in FIG. 8, exhaust gases from the engine combustor pass through the annular duct 36 and create grazing flow that is substantially parallel to the outer surface of the perforated portion 108 of the outer skin 102. The velocity of the grazing exhaust flow at the perforated portion 108 typically can be about Mach 0.2 to about Mach 0.4, or higher. Sound waves from the grazing flow "A" propagate through the perforated portion 108 of the outer skin 102 and into the forward resonator cavity 132b in a direction generally indicated by arrows "B." Note that arrows "B" are substantially perpendicular to the perforated portion 108 of the outer skin 102. In this embodiment, the perforated portion 108 of the outer skin 102 can have a POA of about 20 percent to about 25 percent. The perforated portion 108 may have a higher or lower POA depending upon the desired acoustic impedance and aerodynamic performance of the perforated portion 108. In one embodiment, the perforated portion 108 of the outer skin has a substantially uniform thickness of about 0.02 inch to about 0.05 inch, and includes a plurality of spaced openings 110 extending therethrough. The openings 110 can have a diameter of about 0.005 inch to about 0.050 inch, or any other desired size. In one embodiment, the openings are about 0.02 inch in diameter. These small-diameter openings 110 have an insubstantial effect upon the aerodynamic performance of the outer skin 102, and may be formed in the outer skin 102 by laser drilling, for example. Such small-diameter openings 110 are preferable over larger punched holes that typically range from about 0.04 inch to about 0.08 inch in diameter.

In one embodiment, the perforated intermediate bulkhead 130 can have a POA of about 30 percent to about 40 percent. The intermediate bulkhead 130 may have a higher or lower POA depending upon the desired acoustic impedance of the bulkhead 130. In one embodiment, the intermediate bulkhead 130 is constructed of an aerospace grade titanium alloy, has a substantially uniform thickness of about _0.032 inch, and includes a plurality of spaced openings 136 extending therethrough. In one embodiment, the openings 136 have a diameter of about 0.25 inch. Alternatively, the openings 136 can have a different diameter to provide a different POA and/or spacing of the openings 136, if desired. The intermediate bulkhead 130 may provide structural support to the outer skin 102.

As shown in FIG. 8, the largest dimensions ($L_1$, $L_2$) of the resonator cavities 132b, 134b extend in a direction that is substantially parallel to the longitudinal axis "x-x" of the center plug. Though FIG. 8 shows only one forward cavity 132b and one aft cavity 134b, it should be understood that other circumferentially spaced sets of aligned forward and aft cavities also can exist in the center plug 100 as shown in FIGS. 5 and 6, for example. In operation, sound waves enter the forward cavity 132b in a first direction (indicated by arrows "B"), but propagate through air within the forward and aft cavities 132b, 134b and through the perforated intermediate bulkhead in a second direction (indicated by arrows "C") that is substantially non-parallel to the first direction B. This non-parallel or "folding cavity" arrangement is substantially different from the conventional non-folding resonator cavity shown in FIG. 1 and described above. As shown in FIG. 8, the axially aligned resonator cavities 132b and 134b make effective use of the available longitudinal extent of the center plug 10, such that the effective maximum lengths or depths of the forward and aft resonator cavities ($L_1$, $L_2$) and their combined length "$L_3$" are substantially greater than they otherwise would be if the cavities were of the conventional non-folding type described above. As a result, the relatively deep forward and aft resonator cavities 132a-132d and 134a-134d of the center plug 100 can be tuned to resonantly respond to relatively low-frequency sound energy less than about 800 Hz, and thus dissipate sound energy at such frequencies. In one embodiment of a center plug 100 designed for use in a General Electric CF34-10 turbofan engine, the forward resonator cavities 132a-132b have effective cavity depths of about 10 inches and volumes of about 900 cubic inches, and the aft cavities 134a-134d have volumes of about 700 cubic inches.

In one embodiment, the resonator cavities 132a-132d and 134a-134d are configured to dissipate sound energy between about 400 Hz and about 630 Hz. Accordingly, such a center plug 100 can be effective in dissipating at least some low-frequency sound energy emanating from an aircraft gas turbine engine's combustor, especially at and between idle and approach engine speeds. A center plug 100 according to the invention can be capable of dissipating at least about 6-10 dB of sound energy at a peak frequency of about 400 Hz at turbine speeds of about 1280 rpm to about 1740 rpm as measured at a far-field angle of about 130 degrees. In addition, a center plug 100 according to the invention can be capable of dissipating at least about 2-4 dB of sound energy at a peak frequency of about 400 Hz at turbine speeds of about 2800 rpm to about 3600 rpm as measured at a far-field angle of about 130 degrees. Such reductions in sound power level ("SPL") can substantially contribute to the overall reduction of noise produced by an aircraft gas turbine engine at and between idle and approach engine speeds. For relatively small or short exhaust nozzle center plugs, the intermediate bulkhead 130 may be omitted. In such a single-degree-of-freedom embodiment, the center plug 100 shown in FIG. 8 would include a single cavity extending between the forward bulkhead 112 and the aft bulkhead 160.

Figure 9:
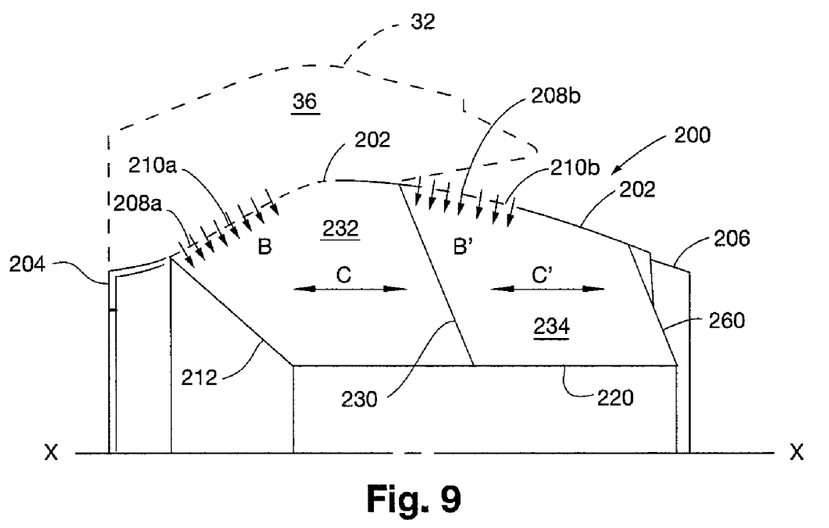
FIG. 9 is a partial longitudinal cross-section of another embodiment of a hot nozzle center plug according to the invention.

FIG. 9 shows another embodiment of a hot nozzle center plug 200 according to the invention. In this embodiment, the center plug 200 includes a plurality of circumferentially spaced forward resonator cavities 232, and a plurality of circumferentially spaced aft resonator cavities 234. The forward and aft cavities 232, 234 are bounded by an inner skin 220, an outer skin 202, a forward imperforate bulkhead 212 proximate to a forward flange 204, and an aft imperforate bulkhead 260 proximate to an aft flange 206. An imperforate intermediate bulkhead 230 separates the forward and aft cavities 232, 234. Unlike the center plug 100 described above, the imperforate intermediate bulkhead 230 substantially prevents sound waves from propagating between the forward and aft cavities 232, 234. Sound waves from the annular exhaust duct 36 propagate through a forward perforated portion 208a of the outer skin 202 that coincides with a forward portion of the forward cavities 232 (as indicated by arrows B in FIG. 9), and thus enter the forward cavities 232. Sound waves also propagate through an aft perforated portion 208b of the outer skin 202 that coincides with a forward portion of the aft cavities 234 (as indicated by arrows B' in FIG. 9), and thus enter aft cavities 234. In the embodiment shown in FIG. 9, the forward and aft perforated portions 208a, 208b form separate perforated bands that extend around substantially the full circumference of the outer skin 202. Though the positions of the perforated portions 208a, 208b shown in FIG. 9 coincide with forward portions of their respective cavities 232, 234, it should be understood that one or both of the perforated portions 208a, 208b can alternatively be positioned to coincide with an aft or other portion of its respective cavity 232, 234. The positions of the perforated portions 208a, 208b may be selected based upon the predicted or measured velocities of grazing exhaust flows at various axial locations along the exhaust duct 36, for example.

In the embodiment shown in FIG. 9, the forward perforated portion 208a of the outer skin 202 includes a plurality of first openings 210a extending therethrough. The aft perforated portion 208b of the outer skin 202 includes a plurality of second openings 210b extending therethrough. The sound waves respectively propagate within the cavities 232, 234 in directions C and C', which are substantially parallel to the central axis x-x of the center plug 200, and are non-parallel to the entry directions B and B'.

In this embodiment, the forward and aft perforated portions 208a, 208b can each have a POA of about 20 percent to about 30 percent. In one embodiment of a center plug 100 designed for use in a General Electric CF34-10 turbofan aircraft engine, the forward and aft cavities 232, 234 each can have an effective cavity depth of about 10 inches, and can have volumes of about 900 cubic inches and about 700 cubic inches, respectively. Alternatively, the effective cavity depths and relative volumes of the forward and aft cavities 232, 234 can be varied to tune the cavities 232, 234 to one or more target frequencies. The relatively deep longitudinal extent of the forward and aft folding resonator cavities 232, 234 permits the cavities to be tuned to dissipate sound energy at frequencies less than about 800 Hz. In one embodiment, the cavities 232, 234 can be tuned to dissipate sound energy at a peak frequency of about 500 Hz.

Figure 10:
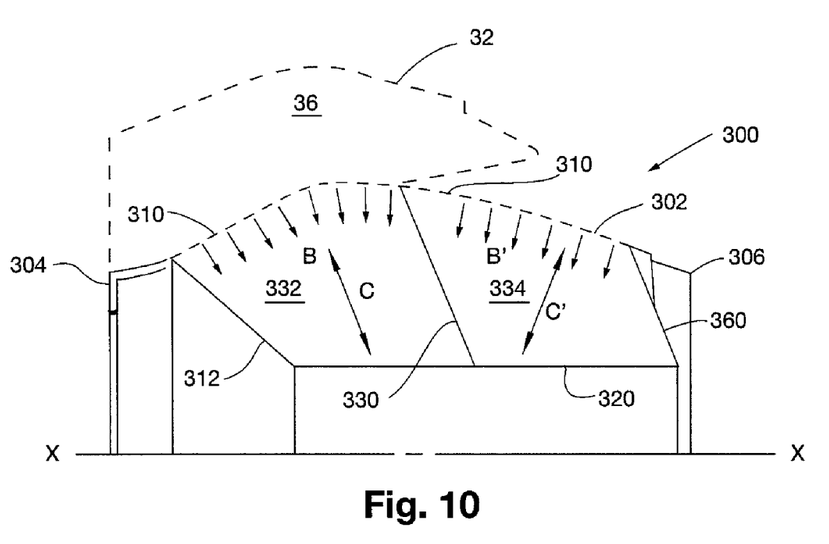
FIG. 10 is a partial longitudinal cross-section of another embodiment of an acoustically treated hot nozzle center plug.

FIG. 10 shows a center plug 300 having substantially non-folding forward and aft resonator cavities 332, 334. As discussed below, such non-folding resonator cavities typically are less effective at dissipating low-frequency sound energy of 800 Hz or less, but can be useful in certain applications. In this arrangement, the center plug 300 includes a plurality of circumferentially spaced forward resonator cavities 332, and a plurality of circumferentially spaced aft resonator cavities 334. The forward and aft cavities 332, 334 are bounded by an inner skin 320, an outer skin 302, a forward imperforate bulkhead 312 proximate to a forward flange 304, and an aft imperforate bulkhead 360 proximate to an aft flange 306. An imperforate intermediate bulkhead 330 separates the forward and aft cavities 332, 334. The imperforate intermediate bulkhead 330 substantially prevents sound waves from propagating between the forward and aft cavities 332, 334.

In the embodiment shown in FIG. 10, substantially the full extent of the outer skin 302 between the forward bulkhead 312 and aft bulkhead 360 can include a plurality of spaced openings 310 extending therethrough. Accordingly, the perforated portion of the outer skin 302 is substantially more extensive than the relatively short axial extents of the perforated portions 108, 208a, 208b of the center plugs 100, 200 shown in FIGS. 8 and 9. In this embodiment, the perforated portions of the outer skin 302 may have a POA of about 20 percent to about 30 percent. The openings 310 permit sound waves from the annular exhaust duct 36 to propagate through the outer skin 302, into the forward cavities 332 (as indicated by arrows B in FIG. 10), and into the aft cavities 334 (as indicated by arrows B' in FIG. 10). The sound waves generally propagate within the cavities 332, 334 in directions C and C', which are substantially parallel to the entry directions B and B'. Thus, in this embodiment, the forward and aft cavities 332, 334 are of the non-folding type, and have relatively shallow effective cavity depths as compared to the cavities of the center plugs 100, 200 described above. For example, in one example of a center plug 300 designed for use in a General Electric CF34-10 turbofan aircraft engine, the forward resonator cavities 332 each have an effective depth of about 5 inches and a volume of about cubic 900 inches, and the aft resonator cavities 334 each have an effective depth of about 4 inches and a volume of about 700 inches. Because of the relatively shallow effective depths of the forward and aft non-folding resonator cavities 332, 334, the cavities 332, 334 only can be effectively tuned to dissipate sound energy at frequencies of about 1000 Hz or greater. Accordingly, such a center plug 300 may be less capable of dissipating low-frequency sound energy of the type produced by an aircraft gas turbine engine's combustor, but can be useful in certain applications.

Figure 11:
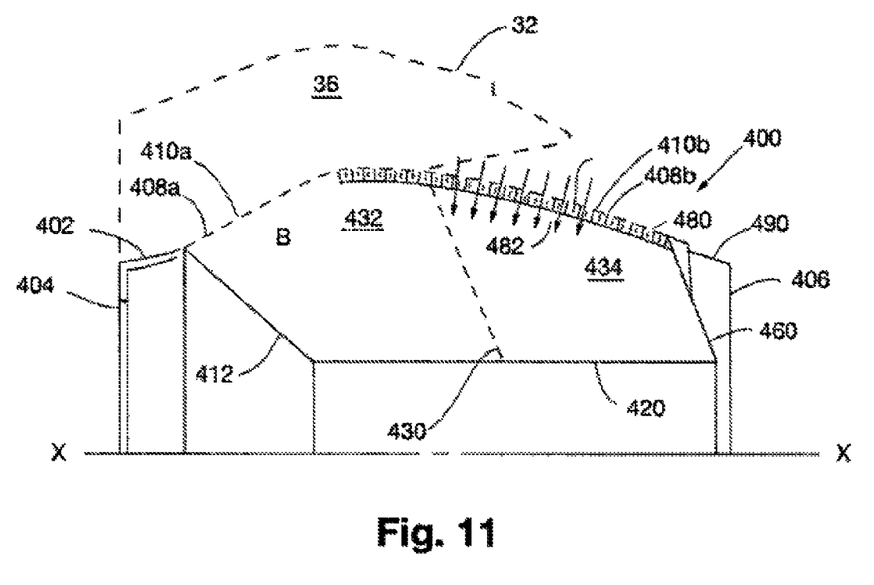
FIG. 11 is a partial longitudinal cross-section of another embodiment of a hot nozzle center plug according to the invention.

FIG. 11 shows another embodiment of an acoustically treated center plug 400 according to the invention. As can be seen by comparing FIG. 11 to FIG. 8, the center plug 400 can be constructed substantially the same as the center plug 100 described above, but with additional high-frequency acoustic treatment along aft portions of the outer skin 402. In this embodiment, the outer skin can include a forward perforated portion 408a that can include a plurality of spaced forward openings 410a extending therethrough, and an aft perforated portion 408b that can include a plurality of spaced openings 410b extending therethrough. The spaced forward openings 410a permit sound waves to enter a large forward folding cavity 432 bounded by the outer skin 402, an imperforate forward bulkhead 412, a perforated intermediate bulkhead 430, and an inner skin 420. The perforated intermediate bulkhead 430 permits sound waves to propagate through the bulkhead 430 and into a large aft folding cavity 434. Accordingly, the large folding cavities 432, 434 of the center plug 400 can be tuned to absorb and dissipate relatively low-frequency sound energy at less than about 800 Hz.

The aft perforated portion 408b of the outer skin 402 substantially coincides with the extent of a cellular core 480 affixed along the inside surface of the outer skin 402. As shown in FIG. 11, the aft perforated portion 408b, cellular core, and an imperforate back skin 482 combine to form a non-folding acoustic liner 490 of a type described above. The acoustic liner 490 may be of the single-degree-of-freedom type as shown in FIG. 11, or can be of the multiple-degree-of-freedom type. The relatively shallow, small-volume resonator cavities of the acoustic liner 490 can be tuned to absorb and dissipate high frequency sound energy within the sound spectrum found proximate to the exhaust nozzle center plug 400. For example, the acoustic liner 490 can be tuned to absorb and dissipate sound energy at frequencies from about 800 Hz to about 6000 Hz, such as high-frequency noise generated by an aircraft gas turbine engine's rapidly rotating turbine blades. Accordingly, in this embodiment, the center plug 400 is capable of absorbing/dissipating at least some relatively low frequency exhaust noise, and at least some relatively high-frequency exhaust noise.

In each of the center plug embodiments 100, 200, 300, 460 described above, the outer skins 102, 202, 302, 402, inner skins 120, 220, 320, 420, forward bulkheads 112, 212, 312, 412, aft bulkheads 160, 260, 360, 460, intermediate bulkheads 130, 230, 330, 430, forward baffles 140a-140d, and aft baffles 150a-150d can be constructed of metal alloy sheet capable of withstanding temperatures greater than about 1230 degrees F. For example, each of these components may by constructed of a high temperature aerospace grade titanium alloy, such as Ti-6-2-4-2, or the like. Alternatively, the various components can be constructed of different materials depending upon the operating temperatures and structural requirements for each component. The various components of the center plug 100, 200, 300, 400 can be joined by any suitable method or combination of methods, including welding and joining with fasteners, such as screws or rivets.

Persons of ordinary skill in the art will recognize that certain modifications can be made to the various embodiments of the invention described herein without departing from the scope of the invention. For example, though the bulkheads of the described center plugs are shown with a forward slope for primarily structural purposes, one or more of the bulkheads may be substantially perpendicular to the longitudinal axis of the center plug, or may slope in an aft direction. In addition, the number of baffles, bulkheads, and resonator cavities can be varied depending on the overall size of the center plug, the desired acoustic properties of the center plug, etc. Furthermore, the POA of the perforated portions of the outer skin can be varied to address aerodynamic performance requirements and to target various noise frequency ranges. All such modifications are intended to be within the scope of the appended claims.

What is claimed is:

1. A sound-absorbing exhaust center plug for an aircraft gas turbine engine comprising:
   a center plug body adapted for attachment within an exhaust nozzle of the engine and comprising:
   (a) an outer skin;
   (b) at least one forward cavity within the plug body;
   (c) at least one aft cavity within the plug body and substantially aft of the forward cavity; and
   (d) a wall separating the forward cavity from the aft cavity, the wall including a plurality of first openings therethrough;
   wherein the outer skin includes a second plurality of openings providing an acoustic pathway through the outer skin and into the forward cavity.

2. A center plug according to claim 1 wherein the outer skin includes a forward skin portion substantially coinciding with an axial position of the forward cavity and an aft skin portion, and wherein the second plurality of openings are in the forward skin portion.

3. A center plug according to claim 1 wherein the forward and aft cavities cooperate to attenuate sound having a frequency of about 400 Hz to about 600 Hz.

4. A center plug according to claim 1 and further comprising:
   (a) a plurality of forward cavities within the plug body;
   (b) a plurality of aft cavities within the plug body being substantially aft of the forward cavities; and
   (c) wherein the wall comprises at least one first wall separating the forward and aft cavities, the first wall including the plurality of first openings therethrough;
   wherein the outer skin includes the second plurality of openings providing an acoustic pathway through the outer skin and into at least one of the forward or aft cavities.

5. A center plug according to claim 4 and further comprising a plurality of substantially axial baffles separating the plurality of forward cavities from each other.

6. A center plug according to claim 4 and further comprising a plurality of substantially axial baffles separating the plurality of aft cavities from each other.

7. A center plug according to claim 6 wherein the baffles extend in a substantially radially outward direction from a longitudinal axis of the center plug.

8. A center plug according to claim 6 and further comprising an inner skin forming a substantially hollow center portion of the plug body.

9. A center plug according to claim 6 wherein the baffles include outermost edges, and wherein radial gaps exist between at least some of the outermost edges and the outer skin.

10. A center plug according to claim 1 wherein the forward and aft cavities each have a largest dimension that extends in a substantially forward-aft direction.

11. A noise-absorbing center plug for a jet engine exhaust nozzle
comprising: (a) a plug body adapted for assembly within the exhaust nozzle; (b) a plurality of walls defining a plurality of circumferentially spaced resonator cavities within the plug body; and (c) at least one wall separating at least one of the resonator cavities into a forward sub-cavity and an aft sub-cavity, the wall including a plurality of first openings therethrough.

12. A noise-absorbing center plug according to claim 11 and further comprising an outer skin at least partially enclosing the circumferentially spaced resonator cavities.

13. A noise-absorbing center plug according to claim 12 wherein the outer skin includes a plurality of second openings extending therethrough, the plurality of second openings providing acoustic pathways through the outer skin and into at least one forward sub-cavity.

14. A noise-absorbing center plug according to claim 12 wherein the outer skin includes a plurality of second openings extending therethrough, the plurality of second openings providing acoustic pathways through the outer skin and into at least one aft sub-cavity.

15. A noise-absorbing center plug according to claim 12 wherein the outer skin includes a plurality of second openings extending therethrough and a plurality of third openings extending therethrough, the plurality of second openings providing acoustic pathways through the outer skin and into at least one forward sub-cavity, and the plurality of third openings providing acoustic pathways through the outer skin and into at least one aft sub-cavity.

16. A noise-absorbing center plug according to claim 11 and further comprising an inner skin forming a substantially open center cavity within the plug body.

17. A noise-absorbing exhaust nozzle center plug for an aircraft gas turbine engine comprising:
a plug body having a first longitudinal axis and comprising:
(a) an outer skin surrounding the plug body;
(b) an inner skin, the outer skin and inner skin forming a substantially annular space therebetween;
(c) a plurality of walls separating the annular space into a plurality of substantially longitudinally-extending cavities; and
(d) at least one wall dividing the longitudinally extending cavities into forward and aft sub-cavities, the wall including a first plurality of openings therethrough;
wherein the plug body is configured for assembly within an exhaust nozzle of the aircraft gas turbine engine.

18. A noise attenuating exhaust nozzle center plug according to claim 17 wherein the outer skin includes a second plurality of openings extending therethrough, the second plurality of openings forming a plurality of acoustic pathways through the outer skin and into at least a portion of the forward or aft subcavities.

19. A center plug for an aircraft gas turbine engine exhaust nozzle comprising:
a plug body comprising:
(a) a plurality of walls dividing an interior portion of the plug into a plurality of forward cavities and a plurality of aft cavities; and
(b) means for permitting passage of sound energy between the forward and aft cavities; and
(c) means for restricting the sound energy passing between the forward and aft cavities to a substantially plane mode of oscillation; wherein the plug body is configured for assembly within the gas turbine engine exhaust nozzle.

20. A center plug according to claim 19 wherein the means for restricting sound energy comprises an at least partially perforated wall between the plurality of forward cavities and the plurality of aft cavities.

21. An acoustically treated center plug for an aircraft gas turbine engine exhaust nozzle comprising:
a plug body configured for assembly within the engine exhaust nozzle and comprising:
(a) an outer skin having a first perforated portion including a first plurality of openings therethrough, and having a second perforated portion including a second plurality of openings therethrough;
(b) at least one folding resonator cavity within the plug body that is configured to receive sound waves that propagate through the first perforated portion;
(c) a plurality of non-folding resonator cavities within the body that are configured to receive sound waves that propagate through the second perforated portion; and
(d) an inner skin forming a substantially hollow conduit through the center plug;
wherein the folding resonator cavity is configured to resonate in response to sound waves in a first range of frequencies, and wherein the non-folding resonator cavities are configured to resonate in response to sound waves in a second range of frequencies different from the first range of frequencies.

22. An acoustically treated center plug according to claim 21 wherein the folding resonator cavity substantially extends in a forward-to-aft direction.

23. An acoustically treated center plug according to claim 21 wherein the folding resonator cavity includes a perforated wall that divides the cavity into first and second portions.

24. An acoustically treated center plug according to claim 21 and comprising a plurality of folding resonator cavities within the outer skin, wherein the folding resonator cavities are configured to receive sound waves that propagate through the first perforated portion.

25. A jet engine comprising:
(a) an exhaust nozzle;
(b) a center plug at least partially disposed in the exhaust nozzle, the center plug comprising:
(i) a plurality of walls defining a plurality of circumferentially spaced resonator cavities;
(ii) at least one wall separating at least one of the resonator cavities into a forward sub-cavity and an aft sub-cavity, the wall including a plurality of openings therethrough.

* * * * *